Jan. 6, 1953  A. R. YOUNGER  2,624,856
ELECTRIC MOTOR FOR SEWING MACHINES
Filed May 3, 1950

Inventor.
Alexander Reginald Younger,
by Singer, Stern & Carlberg,
Attorneys.

Patented Jan. 6, 1953

2,624,856

UNITED STATES PATENT OFFICE

2,624,856

ELECTRIC MOTOR FOR SEWING MACHINES

Alexander Reginald Younger, London, England

Application May 3, 1950, Serial No. 159,798
In Great Britain May 3, 1949

2 Claims. (Cl. 310—74)

This invention relates to driving means for sewing machines and also to such machines built with such driving means, and has for its object to provide such means and machines of advantageous form.

According to the present invention the driving means comprises an electric motor of the induction brushless type, having a stator which includes a casing or framework attachable to or built with the machine framework, together with a rotor which includes an integral annular casing to rotate therewith and to come around and enclose or partially enclose the stator, and further to replace and act in the capacity of the usual balance or fly wheel.

The rotor casing in addition to carrying out the functions of the usual balance or fly wheel can also be used to drive means for winding spools or bobbins. Again, the hand of the machinist can be used on said rotor casing as braking means (upon the switching-off of the current).

By suitably adapting attaching means for the rotor to the driving shaft, and supporting means for the stator, driving means in accordance with the invention can be used to replace the usual balance or fly wheel. In this manner sewing machines normally pedal or hand driven, readily can be adapted to be driven electrically.

A knee- or foot-operated switch and variable resistance or choke is provided in the leads to the motor for the starting and stopping and control of the running of the machine and if desired a needle "light" also can be fitted.

Further, the induction brushless electric motor can be for A. C. and of the shaded or salient pole type to limit the maximum speed at which the machine can run.

Figure 1:
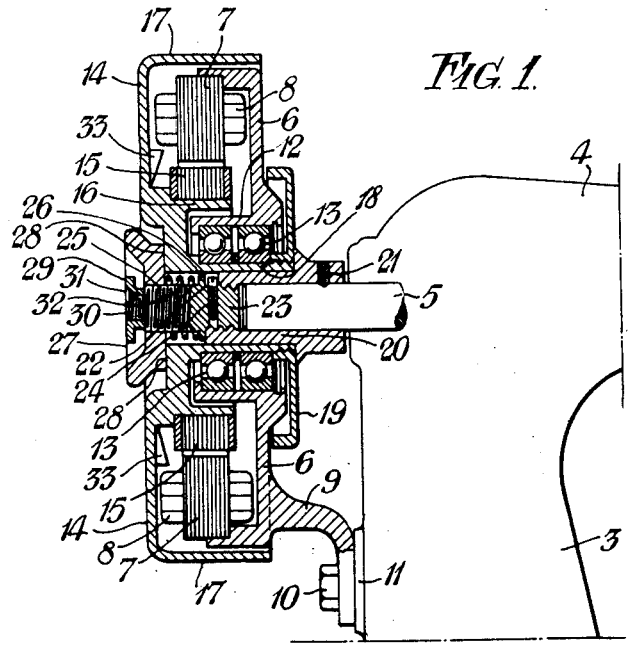
Figure 2:
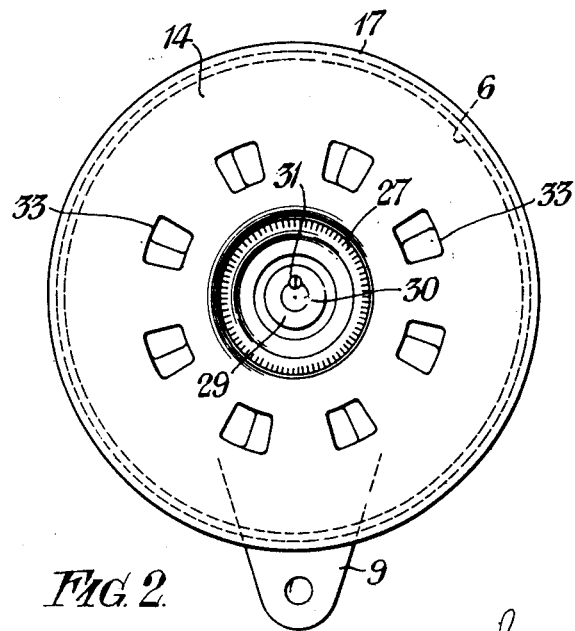

In order that the invention may be better understood, it will now be described with reference to the accompanying diagrammatic drawings which are given by way of example only and in which:

Fig. 1 is a somewhat diagrammatic elevation of one form of driving means for a sewing machine, which is fitted to the machine in place of the usual balance or fly wheel, and Fig. 2 is an end elevation of Fig. 1.

In the drawings, 3 represents part of the standard and 4 part of the horizontal arm of the usual sewing machine framework whilst 5 is a portion of the machine driving shaft projecting out from the horizontal arm, these parts being but diagrammatically indicated to illustrate their co-relation with the structure to be described.

The induction brushless electric motor forming the driving means comprises a stator and a rotor.

The stator comprises a casing or framework 6 carrying the stator laminations 7 and stator coils 8, which parts are only sketchily indicated for the sake of clearness. The stator casing can be of a suitable metal or a suitable plastic and consists of a circular backplate with a peripheral flange, the plate having a bracket 9 to be attached by a screw 10 to an existing machined part 11 on the standard 3. In addition the plate has a hollow concentric sleeve 12 in which are fitted two ball bearings 13 by their outer races.

The rotor comprises a casing 14 of a suitable metal or plastic carrying the laminated rotor proper 15 by a hollow sleeve 16 and including an outer flange 17 to extend rearwardly and come around the flange of the stator casing 6 with a desired clearance. In addition, it has an inner hollow sleeve 18 on which the inner races of the ball bearings 13 are mounted. 19 is a flanged disc having a screwed boss to engage a screw thread on the exterior of the sleeve 18 at its free end. This disc thus turns with the rotor and it is used for the spool or bobbin re-wind.

The structure thus far particularly described completes the induction brushless motor and it will be appreciated that this motor is fully encased and that part of the casing rotates with the rotor and comes around and partly encloses the stator and further replaces the usual balance or fly wheel.

In the example shown in the drawings, the normal sewing machine includes a shouldered collar and sleeve 20 fixed to the driving shaft by a set screw 21. The bore towards the outer end of the sleeve is threaded and the actual end has a notch or recess 22. Normally the usual balance or fly wheel is located on the collar and sleeve.

To adapt the induction brushless motor as particularly described to drive the shaft 5, the interior of the inner hollow sleeve 18 of the rotor casing has a bore which is a running fit on the exterior of the said collar and sleeve 20 up to the shoulder thereof.

There is further provided an extension of the shaft 5 which is screw threaded on the exterior. This extension comprises a rear part 23 to screw into the female thread on the collar and sleeve 20, where it is maintained by a cross screw bore and screw 24 which projects into the notch 22. The front part 25 of the extension is divided from the rear 23 by a flange 26 which abuts the end of the sleeve 20.

On the front part 25 is screwed a hand-operated milled clamping nut 27 which when screwed home abuts the rotor casing 14 at 28 in the manner of a single surface clutch, to cause the shaft extension and consequently the driving shaft 5 to turn with the rotor.

To unclutch the parts it is simply necessary to loosen the nut 27, its outer limit of travel being defined by a stop nut 29, screwed on a reduced threaded end 30 of the front part 25 and held in position by a small locking screw 31. 32 is a light compression spring around the front part 25 and in the sleeve 18 to assist the loosening action of the nut 27.

When the nut 27 is tightened up and the current switched on to the motor, it will be realised that the movement of the rotor is imparted to the shaft 5. When it is required to rewind spools or bobbins, then the nut 27 is loosened and the rotor turns on the exterior surface of the collar and sleeve 20 on which it is a running fit and the shaft 5 is not driven; the flanged disc 19 is used for spool or bobbin re-winding.

If desired, the rotor may be formed or provided with ventilation means, for example as shown in the drawings the flat face of the rotor casing 14 has a series of openings 33 with rearwardly extending inclined portions to form a species of ventilating fan for causing a circulation of air to pass through the interior of the motor.

As will be realised, in addition to the rotor casing acting to replace the balance or fly wheel, and acting as a braking surface when stopping the machine, it also can be used for "inching," that is, generally feeding the work by hand with the motor out of action. For heavy duty machines, in place of the hand acting as a brake on the rotor, any suitable braking means may be provided so that it can be brought into action when the motor is switched out of circuit.

Although in the particular example shown in the drawings simple frictional clutching means is provided between the rotor and the shaft to be driven, in some cases this clutching means may be of a definite mechanical character and similar to such devices already in use in existing sewing machines.

In some cases the rotor casing beyond the end of its flange may have an inturned flange, detachable and suitably fixed in position, to come down on the exterior of the stator framework or casing on this other side, this additional flange having a desired aperture to clear the central parts of the mechanism. Thus, in effect there is provided an almost totally enclosing rotary casing turning with the rotor and within which the motor is housed.

In the particular example, the invention has been described as applied to a replacement driving unit for an existing machine.

However, it will be understood that the sewing machine could be built with electric motor driving means in accordance with the invention, the main difference merely being that the stator framework or casing is integral with the framework of the machine.

Further, when driving means in accordance with the invention is built with the sewing machine, the rotor is made to be mounted as a running fit on the driving shaft or a part carried thereby and in this case the stator is so built that it registers concentrically with the rotor.

The invention is not limited to the precise forms or details of construction herein described, as these may be varied to suit particular requirements.

What I claim and desire to secure by Letters Patent of the United States of America is:

1. Driving means for sewing machines comprising an electric motor having a stator and a rotor, the stator having a casing with a circular back plate provided at its circumference with a peripheral flange and adapted to be fixedly secured to the sewing machine framework, the rotor having an annular casing extending outwardly from one end thereof and then radially outwardly to terminate in an inwardly extending cylindrical flange surrounding the outer circumference of the stator, means for mounting said rotor on the driving shaft of the sewing machine, a sleeve portion formed on the stator casing and positioned inside the rotor, a sleeve formed on the rotor and positioned inside the stator sleeve concentric thereto, and anti-friction bearings mounted between said sleeve portions for rotatably supporting the rotor whereby its annular casing serves as the balance or fly wheel of the sewing machine.

2. Driving means for sewing machines as claimed in claim 1, in which the inner sleeve of the rotor casing has an inner bearing adapted to be mounted as a running fit on a shouldered collar and sleeve fixed to the driving shaft of the machine.

ALEXANDER REGINALD YOUNGER.

REFERENCES CITED

The following references are of record in the file of this patent:

UNITED STATES PATENTS

| Number | Name | Date |
|---|---|---|
| 411,983 | Diehl | Oct. 1, 1889 |
| 657,165 | Huyck | Sept. 4, 1900 |
| 703,649 | Gill | July 1, 1902 |
| 765,078 | Jigouzo | July 12, 1904 |
| 1,407,508 | Apple | Feb. 21, 1922 |
| 1,643,191 | Welch | Sept. 20, 1927 |
| 2,432,291 | Dayton | Dec. 9, 1947 |